Sept. 16, 1952 — J. MARCANTEL — 2,610,729
PUSHER FEED SAW TABLE LOADING DEVICE
Filed July 30, 1948 — 2 SHEETS—SHEET 1
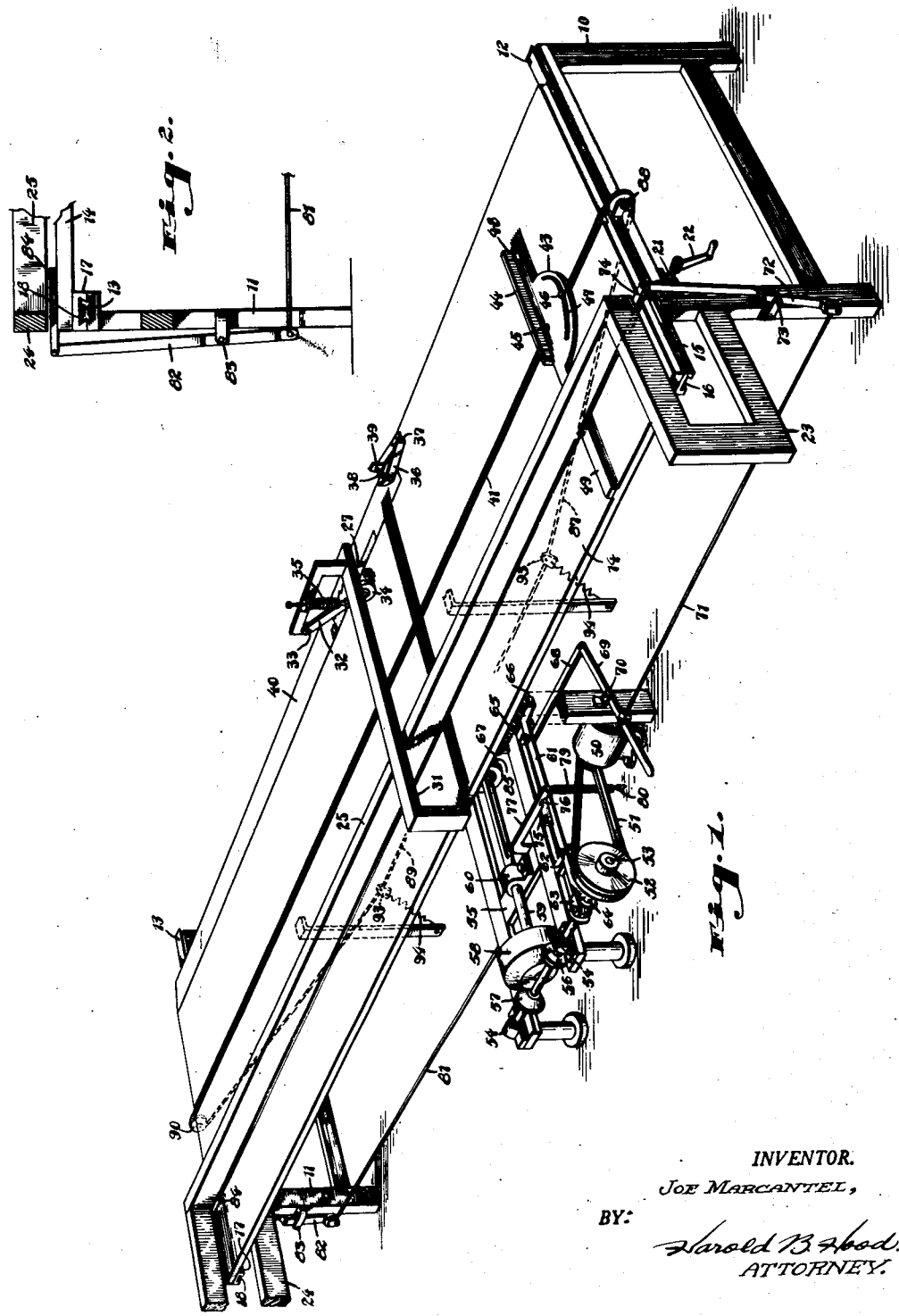
INVENTOR.
JOE MARCANTEL,
BY: Harold B. Abod.
ATTORNEY.

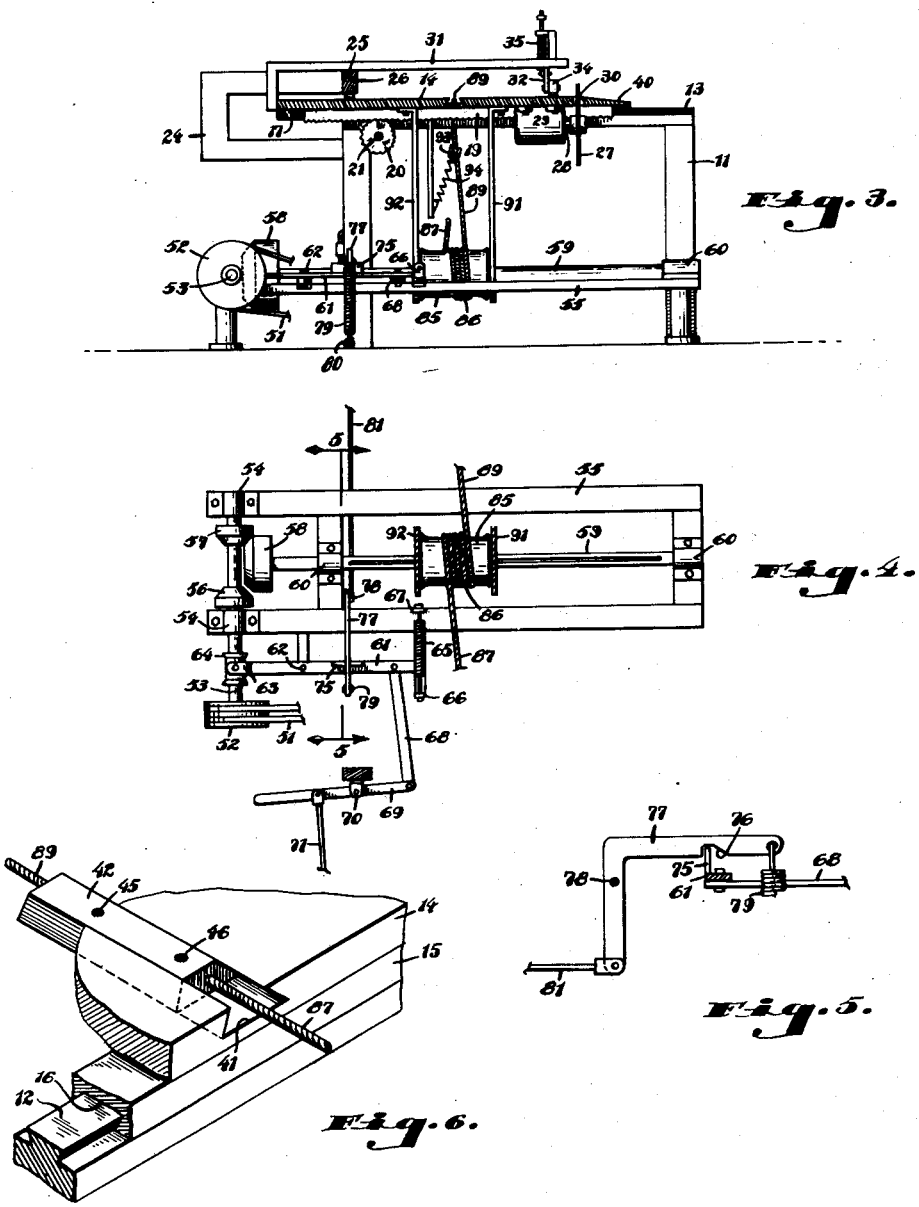

Patented Sept. 16, 1952

2,610,729

UNITED STATES PATENT OFFICE 2,610,729

PUSHER FEED SAW TABLE LOADING DEVICE

Joe Marcantel, Oakdale, La., assignor to Hillyer Deutsch Edwards, Inc., Oakdale, La., a corporation of Louisiana Application July 30, 1948, Serial No. 41,647

13 Claims. (Cl. 198—221)

The present invention relates to an improved loading table, and more particularly to a device intended to provide a platform or table upon which individual elements may be assembled in a desired grouping, and then moved, as groups, off one end of the table. The primary object of the invention is to provide, in a device of the character described, mechanism for driving a pusher, of such character that, when a control is actuated to initiate operation of such mechanism, the pusher will be driven, from a predetermined station adjacent one end of the table, to a predetermined point adjacent the opposite end of the table, then returned to the starting point, and then stopped at that starting point, all without further attention from the operator.

Further objects of the invention include the provision of improved mechanism for accomplishing the above results, and the provision, in connection therewith, of means for shifting the table transversely with respect to the direction of movement of the pusher, and relative to a guide element; and the provision of means, movable with the table, for cutting the material to be moved by the pusher to a desired width. Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view of a loading table constructed in accordance with my invention;

Fig. 2 is a fragmentary longitudinal section showing a part of the automatic operating means;

Fig. 3 is a transverse section taken near the mid-point of the table;

Fig. 4 is a plan view of the driving mechanism illustrated in Fig. 3;

Fig. 5 is a fragmentary section taken substantially on the line 5—5 of Fig. 4; and Fig. 6 is an enlarged fragmentary perspective view showing the details of the mounting of a carrier with respect to the table.

Referring more particularly to the drawings, it will be seen that I have illustrated a pair of frame members 10 and 11, adapted to support opposite ends of a table 14 for movement transversely of the length of the table. If desired, a further number of similar frame elements may be arranged at suitable points along the length of the table. Dovetailed rails 12 and 13 are arranged at the upper ends of the frame members 10 and 11, and are received in dovetailed grooves 16 and 18 in bars 15 and 17 secured to the under surface of the table or platform 14. Transversely arranged upon the under surface of the table 14, I provide one or more toothed racks 19 (Fig. 3), each meshing with a gear 20 fixed to a shaft 21 supported in suitable bearings carried by the frame members 10 and 11; and I prefer to provide a crank 22 (Fig. 1) upon at least one projecting end of the shaft 21. It will be obvious that rotation of the crank 22 in one direction or the other will produce transverse movement of the table 14 with respect to the frame members 10 and 11.

C brackets 23 and 24, carried by the frame members 10 and 11, respectively, support a guide bar 25 at a level spaced slightly above the uppermost surface of the table 14, said guide bar providing a surface 26 facing that edge of the table 14 remote from the brackets 23 and 24, and parallel therewith. At a point intermediate the ends of the table 14, and adjacent that edge remote from the brackets 23 and 24, I provide a circular saw 27 carried upon the spindle 28 of an electric motor 29 suitably secured to the under surface of the table 14, a portion of the periphery of said saw projecting through a suitable slot 30 formed in said table. It will be apparent that adjustment of the position of the table 14 by means of the crank 22 will vary the distance between the guide bar surface 26 and the plane of the saw blade, which plane is parallel with the surface 26.

A bracket 31 secured to that edge of the table adjacent the brackets 23 and 24 projects into proximity with the saw 27, and there carries an arm 32, pivotally mounted at 33 and carrying a roller 34. A spring 35 resiliently presses the roller 34 toward or into engagement with the upper surface of the table 14. It will be obvious that the function of the roller 34 is to hold material, being moved along the table, intimately down into contact with the upper surface of the table.

A presser arm 36 is pivotally mounted at 37 upon the upper surface of the table 14, the fixed end of said arm being located closer to the adjacent edge of the table than is the plane of the saw 27. The opposite end of the arm 36 is urged toward the guide surface 26 by a spring 38 backed by a suitable abutment member 39. It will be obvious that the arm 36 acts to press material moving along the table 14 toward, and into intimate contact with, the guide surface 26.

Preferably, that portion 40 of the table which is located between the saw and the discharge end of the table and between the saw and the adjacent edge of the table, inclines downwardly and toward said edge, as is clearly to be seen in Figs. 1 and 3.

Substantially on the median longitudinal line of the table, there is formed a dovetailed groove or slot 41 in which is snugly and guidingly received a carrier block 42. The upper surface of the block 42 lies substantially flush with the upper surface of the table 14; and a plate 43 is secured to said block by means of a pivot bolt 45 and a clamping bolt 46. The clamping bolt 46, as is clearly shown in Fig. 1, has its shank received in an arcuate slot 47 in the plate 43, thereby providing for adjustment of the plate 43 about the axis of the pivot bolt 45. A pusher bar 44 is carried on, or integral with, the plate 43, said pusher bar extending transversely in both directions from the carrier 42. One end 48 of said bar terminates short of the plane of the saw 27, while the other end 49 thereof projects to the edge of the table remote from said plane.

An electric motor 50 is connected by one or more belts 51 to drive a pulley 52 on a shaft 53 mounted for rotation and axial reciprocation in bearings 54 supported upon a sub-frame 55. The shaft 53 carries, between the bearings 54, a coned friction wheel 56 and, at an axially spaced point, an oppositely facing coned friction wheel 57. Said wheels 56 and 57 are arranged for alternative frictional driving engagement with a coned friction wheel 58 fixed to a shaft 59 suitably supported in bearings 60 carried by the frame 55. In the illustrated embodiment of the invention, the axis of the shaft 53 perpendicularly intersects an extension of the axis of the shaft 59, and the wheels 56 and 57 are therefore arranged to engage, alternatively, points diametrically opposed on the coned face of the wheel 58. As is most clearly to be seen in Fig. 4, the distance between the coned faces of the wheels 56 and 57 slightly exceeds the lineal distance between the points on the wheel 58 to be engaged by the wheels 56 and 57, respectively. Thus, the wheels 56 and 57, which are fixed to the shaft 53, may obviously assume the positions illustrated in Fig. 4, a position in which the wheel 56 drivingly engages the wheel 58, or an intermediate position in which neither of the wheels 56 and 57 engages the wheel 58.

A lever 61 is pivotally mounted at 62 upon the sub-frame 55 and carries, at one end, a yoke 63 operatively engaging clutch collar 64 on the shaft 53, the collar 64 being axially fixed, but rotationally loose, relative to the shaft 53. A spring 65 has one end anchored on an ear 66 adjacent the opposite end of the lever 61, and its other end anchored to a suitable abutment 67 on the sub-frame 55, said spring constantly urging the lever 61 to move in a counter-clockwise direction, as viewed in Fig. 4, to hold the wheel 57 in driving engagement with the wheel 58. A link 68 connects said last-mentioned end of the lever 61 with one end of a lever 69 pivotally supported at 70 upon the sub-frame. The other end of said lever 69 is located adjacent an operating station; and a link 71 connects the latter end of said lever 69 with one end of a lever 72 pivotally mounted at 73 upon the frame element 10. The upper end of lever 72 hingedly carries a leaf 74 which rests upon the upper surface of the table 14 in the region beneath the guide bar 25.

The lever 61 is provided with an upstanding flange 75 adapted, when said lever has been swung in a clockwise direction, as viewed in Fig. 4, to be engaged in a notch 76 in a latch lever 77 (Fig. 5), thus to restrain the lever 61 against movement in a counter-clockwise direction under the influence of the spring 65. The arrangement of parts is such that, when the flange 75 is engaged in the notch 76, the wheel 56 will drivingly engage the wheel 58. A spring 79 is connected to the lever 77 and anchored at 80 (Fig. 3), said spring tending to hold the lever 77 in such a position as to retain the flange 75 once said flange enters the notch 76.

The lever 77 is pivotally mounted at 78 (Fig. 5) on the sub-frame, and a link 81 connects said lever with the lower end of a lever 82 pivoted at 83 on the frame member 11 (Figs. 1 and 2). A leaf 84 is hingedly connected to the upper end of the lever 82, and rests upon the upper surface of the table 14 in the region immediately below the guide bar 25.

Splined on the shaft 59 is a drum 85, the arrangement being such that said drum rotates with the shaft 59, but may freely move axially with respect thereto. A cable 86 is wrapped about said drum 85, and one portion 87 extends from the drum, around a sheave 88 mounted at one end of the table 14, and, lying in the groove 41, is connected to the adjacent end of the carrier block 42. The other end 89 of the cable projects in the opposite direction from the drum, passes around a sheave 90, mounted at the opposite end of the table 14, and, lying in the groove 41, is connected at the opposite end with the carrier block 42.

Obviously, rotation of the shaft 59 in one direction will cause the carrier and the pusher 44 to be moved from their illustrated positions toward the opposite end of the table, while rotation of the shaft 59 in the opposite direction will cause the pusher to be returned toward its illustrated position.

Two fingers 91 and 92 (Fig. 3) are fixedly secured to the under surface of the table 14 and project downwardly therefrom, said fingers being provided with oppositely facing surfaces cooperable with the opposite ends, respectively, of the drum 85 to maintain the position of the drum with respect to the table substantially constant, in spite of transverse adjustment of the table through the medium of the crank 52. In the illustrated embodiment of the invention, the mutually facing surfaces of the fingers 91 and 92 are spaced apart very slightly more than the distance between the opposite end faces of the drum 85, and therefore cooperate with the drum to shift said drum axially of the shaft 59 whenever the table 14 is shifted with respect to the frame members 10 and 11.

I prefer to thread a sheave 93 on each portion 87 and 89 of the cable 86, between the drum 85 and each sheave 88 and 90, and to attach to each such sheave one end of a spring 94 whose opposite end is suitably anchored; this for the purpose of taking up slack in that portion of the cable which is, at any moment, being paid out from the drum.

The operation of the disclosed machine will be understood from the above description. A group of articles to be moved will be loaded on the table, in suitable arrangement, in the region between the pusher 44 and the saw 27. Now, the operator will swing the projecting end of lever 69 toward the sub-frame 55, thereby shifting the flange 75 into engagement with the notch 76, and moving the wheel 56 into driving engagement with the wheel 58. The motor 50 will drive the shaft 53 in a clockwise direction as viewed in Fig. 3, whereby engagement of the wheel 56 with the wheel 58 will rotate the drum 85 in a direction to wind in the portion 89 of the cable 86 and to pay out the portion 87 thereof. The carrier block 42 and the pusher block 44 will thereby be driven from their illustrated positions toward the remote end of the table, thereby carrying the articles in front of the pusher past the saw and toward said remote table end. Pieces cut away by the saw 27 will tend to fall from the inclined portion 40 of the table.

As the pusher 44 approaches the remote end of the table, the portion 49 of said pusher will engage the leaf 84 (Figs. 1 and 2) to rock the lever 82 in a counter-clockwise direction. Such movement of the lever 82, transmitted through the link 81, will lift the lever 77 out of engagement with the flange 75 on the lever 61, to permit the spring 65 to shift said lever in a counter-clockwise direction as viewed in Fig. 4 to move the shaft 53 and wheels 56 and 57 into the positions illustrated in Fig. 4. Driving engagement between the wheels 57 and 58 will, of course, cause rotation of the shaft 59 in the opposite direction, to pay out on the cable portion 89 and to wind in the cable portion 87. Thereby the carrier block 41 and pusher 44 will be moved from the remote end of the table 14 toward their illustrated positions. As the portion 49 of the pusher 44 approaches the righthand end of the table 14 it will engage the leaf 74, and will begin to swing the lever 72 in a clockwise direction. Such motion of the lever 72 is transmitted, through the link 71, to the lever 69 to move said lever and, through the link 68, the lever 61 in a clockwise direction, as viewed in Fig. 4. Such movement of the levers 69 and 61 is resisted by the spring 65, and it will be clear that the wheel 57 will be moved out of driving engagement with the wheel 58 before the wheel 56 attains driving engagement with said wheel 58. Since there is no force, except that exerted through movement of the pusher 44, which will continue the swinging of the levers 69 and 61, it will be apparent that, when the wheels 56 and 57 reach a neutral position, in which neither is drivingly engaged with the wheel 58, rotation of the shaft 59 will stop; and the motor 50 may continue to operate, without affecting the pusher 44, until the operator again manually shifts the lever 69.

It will be clear that, by substituting for the leaves 74 and 84, or either of them, other leaves of different lengths, the terminal positions of the pusher 44 may be suitably varied; and that a similar result could be accomplished by making the leaves 74 and 84, or either of them, of variable length.

The present invention has been designed primarily for the purpose of moving glued core stock into an electronic setting machine; and it is particularly adapted for that function; but it will be clear that the machine has a broader application and may be used wherever it is desired to move an assembled group of articles from an assembly point to a point of use, or a point at which some other operation thereupon is to be effected.

I claim as my invention:

1. A loading device comprising a table, a pusher mounted on said table means for driving said pusher relative to said table, including a rotary element, means providing a driving connection between said rotary element and said pusher, power delivery means, reversible power-transmission means interposed between said power-delivery means and said rotary element, means resiliently urging said transmission means to a position to transmit power to said rotary element in one direction, latch means operable, at times, to hold said transmission means in a position to transmit power to said rotary element in the other direction, means movable with said pusher for releasing said latch means, after movement of said pusher in said other direction to a predetermined degree, and means actuated by said pusher, upon movement thereof to a predetermined degree in said one direction, to shift said transmission means to a neutral position.

2. The device of claim 1 including a frame supporting said table, means for shifting said table relative to said frame in a direction transverse to the line of movement of said pusher, work-guiding means stationarily supported on said frame and overhanging said table in substantial parallelism with the line of movement of said pusher, and means transversely fixed relative to said table and relative to said rotary element to enforce transverse movement of said rotary element with said table whereby the driving connection between said rotary element and said pusher is maintained unchanged during shifting adjustment of said table in said transverse direction.

3. The device of claim 2 including a rotary saw mounted to rotate in a plane parallel with the plane of said work-guiding means, means supporting said saw on said table with its axis of rotation beneath said table and a portion of its periphery projecting through said table, and drive means for said saw mounted on and movable with said table.

4. The device of claim 1 including a frame supporting said table and means for shifting said table relative to said frame in a direction transverse to the line of movement of said pusher, and in which said rotary element is a shaft mounted beneath said table on a fixed axis transverse to the line of movement of said pusher and a drum axially-slidably mounted on said shaft to rotate therewith, and in which said driving connection comprises a continuous strand having its midportion wrapped about said drum and extending oppositely from said drum to and about separate guide means adjacent opposite ends of said table and connected to said pusher.

5. The device of claim 4 including work-guiding means overhanging said table and providing a guiding surface parallel with the line of movement of said pusher and fixed with respect to said frame, and abutment means carried by said table to move therewith and cooperating with said drum to enforce axial movement of said drum in response to shifting movement of said table.

6. A loading device comprising a table, a pusher mounted on said table, means for driving said pusher relative to said table, including a shaft mounted beneath said table on a fixed axis transverse to the line of movement of said pusher, a drum axially-slidably mounted on said shaft to rotate therewith, a continuous strand having its midportion wrapped about said drum and extending oppositely from said drum to and about separate guide means adjacent opposite ends of said table and connected to said pusher and providing a two-way driving connection between said drum and said pusher, power delivery means, reversible power-transmission means interposed between said power delivery means and said shaft for driving said shaft and drum, means for shifting said table relative to said frame in a direction parallel with the axis of said shaft, work-guiding means overhanging said table and providing a guiding surface parallel with the line of movement of said pusher and fixed with respect to said frame, and means depending from said table and movable therewith, said last-named means providing two facing surfaces spaced from each other, in the direction of extent of said shaft axis, by a distance slightly exceeding the axial length of said drum, each of said surfaces extending into cooperative relation with an end of said drum.

7. A loading device comprising a table, a pusher mounted on said table, means for driving said pusher relative to said table, including a shaft mounted beneath said table on a fixed axis transverse to the line of movement of said pusher, a drum axially-slidably mounted on said shaft to rotate therewith, a continuous strand having its midportion wrapped about said drum and extending oppositely from said drum to and about separate guide means adjacent opposite ends of said table and connected to said pusher and providing a two-way driving connection between said drum and said pusher, power delivery means, reversible power-transmission means interposed between said power delivery means and said shaft for driving said shaft and drum, means for shifting said table relative to said frame in a direction parallel with the axis of said shaft, work-guiding means overhanging said table and providing a guiding surface parallel with the line of movement of said pusher and fixed with respect to said frame, and means depending from said table and movable therewith, said last-named means providing two oppositely-facing surfaces spaced from each other, in the direction of extent of said shaft axis, by a distance differing only slightly from the effective axial length of said drum, each of said surfaces extending into cooperative relation with an end of said drum.

8. In a loading device comprising a platform and a pusher mounted for reciprocation along said platform, drive means for said pusher comprising a reversibly rotary element, means connecting said rotary element to drive said pusher positively in either direction, a power delivery means, and power transmission means interposed between said power delivery means and said rotary element, said transmission means including a device having a neutral position and shiftable in one direction therefrom to a position providing a forward driving connection between said power delivery means and said rotary element and in the other direction therefrom to a position providing a reverse driving connection between said power delivery means and said rotary element, means biasing said device toward said last-named position, latch means cooperable with said device, at times, to hold the same in said first-named position, means actuated by said pusher at the forward end of its path to release said latch means, and means actuated by said pusher at the reverse end of its path to shift said device into its neutral position.

9. In a loading device comprising a platform and a pusher mounted for reciprocation along said platform, drive means for said pusher comprising a shaft, means providing a two-way driving connection between said shaft and said pusher, a friction wheel fixed to said shaft, a second shaft mounted on an axis transverse to the axis of said first-named shaft, two friction wheels fixed to said second shaft and alternatively cooperatively engageable with portions of said first-named wheel located on opposite sides of a diameter of said wheel, said wheels on said second shaft being spaced apart a distance greater than the lineal distance between said portions of said first wheel, and means for concurrently shifting said last-named wheels in the direction of the axis of said second shaft, including a lever operatively connected with said last-named wheels, spring means cooperating with said lever to hold one of said last-named wheels in driving engagement with said first-named wheel, latch means cooperable with said lever, at times, to hold the other of said last-named wheels in driving engagement with said first-named wheel, means actuated by said pusher adjacent one end of its path to release said latch means, and means actuated by said pusher adjacent the other end of its path to shift said lever against the tendency of said spring to move said one of said last-named wheels out of driving engagement with said first-named wheel.

10. A loading device comprising a table, a pusher mounted on said table, means for driving said pusher relative to said table, including a rotary element, means providing a driving connection between said rotary element and said pusher, power delivery means, power-transmission means interposed between said power delivery means and said rotary element and including a member shiftable between opposite extreme positions to reverse the direction of power output of said transmission and to an intermediate neutral position, means resiliently urging said member to one of said extreme positions, a latch engageable with said member to hold the same, at times, in the other of said extreme positions, means actuated by said pusher, when driven through said transmission during engagement of said latch with said member, to disengage said latch from said member, and means actuated by said pusher, when driven through said transmission with said member in said one extreme position, to shift said member, against the tendency of said resilient means, into said neutral position.

11. In a loading device comprising a platform and a pusher mounted for reciprocation along said platform, drive means for said pusher comprising a reversibly rotary element, means connecting said rotary element to drive said pusher positively in either direction, a power delivery means, and power transmission means interposed between said power delivery means and said rotary element, said transmission means including a device having a neutral position and shiftable in one direction therefrom to a position providing a forward driving connection between said power delivery means and said rotary element and in the other direction therefrom to a position providing a reverse driving connection between said power delivery means and said rotary element, means biasing said device toward said last-named position, a latch engageable with said device, at times, to hold the same in said first-named position, a linkage operatively connected with said latch and including an abutment member located in the path of forward movement of said pusher for actuation thereby to shift said latch to release said device, and a linkage operatively connected with said device and including an abutment member located in the path of reverse movement of said pusher for actuation thereby to shift said device against the tendency of said biasing means into its neutral position.

12. A loading device comprising a table, a pusher mounted on said table, means for driving said pusher relative to said table, including a rotary element, means providing a driving connection between said rotary element and said pusher, power delivery means, power transmission means interposed between said power delivery means and said rotary element and including a member shiftable between opposite extreme positions to reverse the direction of power output of said transmission and to an intermediate neutral position, means resiliently urging said member to one of said extreme positions, a latch engageable with said member to hold the same, at times, in the other of said extreme positions, a movable abutment element, a linkage connecting said abutment element with said latch, striker means moving with said pusher, said abutment element being disposed in the path of movement of said striker means for actuation thereby, as said pusher is driven in one direction through said transmission while said member is held by said latch in said other extreme position, to shift said latch and release said member, a second movable abutment element, and a linkage connecting said second abutment element with said member, said second abutment element being disposed in the path of said striker means for actuation thereby, as said pusher is driven in the opposite direction, to move said member, against the tendency of said resilient means, to its neutral position.

13. In a loading device comprising a platform and a pusher mounted for reciprocation along said platform, drive means for said pusher comprising a shaft, means providing a two-way driving connection between said shaft and said pusher, a driven element rotationally fixed to said shaft, a second shaft mounted on an axis transverse to the axis of said first-named shaft, two driver elements rotationally fixed to said second shaft and alternatively cooperatively engageable with portions of said driven element located on opposite sides of the axis of said first-named shaft, said driver elements being spaced apart a distance greater than the lineal distance between said portions of said driven element, and means for concurrently shifting said driver elements in the direction of the axis of said second shaft, including a lever operatively connected with said driver elements, spring means cooperating with said lever to hold one of said driver elements in driving engagement with said driven element, latch means cooperable with said lever, at times, to hold the other of said driver elements in driving engagement with said driven element, means actuated by said pusher adjacent one end of its path to release said latch means, and means actuated by said pusher adjacent the other end of its path to shift said lever against the tendency of said spring to move said one of said driver elements out of driving engagement with said driven element.

JOE MARCANTEL.

REFERENCES CITED

The following references are of record in the file of this patent:

UNITED STATES PATENTS

| Number | Name | Date |
| --- | --- | --- |
| 14,499 | Gilman | Mar. 25, 1856 |
| 328,771 | Garland et al. | Oct. 20, 1885 |
| 365,512 | Glade | June 28, 1887 |
| 396,763 | Penfield | Jan. 29, 1889 |
| 536,832 | Holt | Apr. 2, 1895 |
| 1,278,814 | Johnson | Sept. 10, 1918 |
| 1,348,389 | Barrett | Aug. 3, 1920 |
| 1,563,388 | Mattison et al. | Dec. 1, 1925 |
| 1,803,857 | Lumb | May 5, 1931 |

FOREIGN PATENTS

| Number | Country | Date |
| --- | --- | --- |
| 34,660 | Sweden | Apr. 16, 1913 |
| 58,190 | Sweden | Jan. 27, 1925 |